US005535263A

United States Patent [19]
Blumhardt

[11] Patent Number: 5,535,263
[45] Date of Patent: Jul. 9, 1996

[54] METHOD FOR RECORDING SUBSCRIBER SPECIFIC MESSAGES IN AN ADVANCED INTELLIGENT NETWORK

[75] Inventor: Mark S. Blumhardt, Niwot, Colo.

[73] Assignee: U S West Technologies, Inc., Boulder, Colo.

[21] Appl. No.: 322,647

[22] Filed: Oct. 13, 1994

[51] Int. Cl.$^6$ .............................. H04M 1/64; H04M 3/42
[52] U.S. Cl. .............................. 379/67; 379/84; 379/94; 379/197; 379/207; 379/230
[58] Field of Search .............................. 379/67, 88, 89, 379/84, 94, 196, 197, 201, 207, 221, 230

[56] References Cited

U.S. PATENT DOCUMENTS 5,251,255  10/1993  Epley ........................................ 379/230
5,418,844  5/1995  Morrisey et al. ........................ 379/67

OTHER PUBLICATIONS

"The Intelligent Network Concept", Jean S. Doyle et al., IEEE Transactions on Communications, vol. 36, No. 12, Dec. 1988, pp. 1296–1301.
"In Rollout in the United States", Peter A. Russo, et al., IEEE Communications Magazine, Mar. 1993, pp. 56–63.

Primary Examiner—Jeffery Hofsass
Assistant Examiner—Fan Tsang
Attorney, Agent, or Firm—Brooks & Kushman

[57] ABSTRACT

A method for recording subscriber specific messages in a telephone call for use in telephone services, particularly, for use in cooperation with an AIN Service Switching Point (SSP), an AIN Service Control Point (SCP) and an Intelligent Peripheral (IP). A CallInfoToResource message is generated at the AIN SCP for receipt by the SSP and the IP. The message instructs the SPP to establish a connection to the IP and further instructs the IP to record a subscriber message. The SSP generates a PRIFACILITY message which is directed for receipt by the IP and instructs the same to play an announcement and begin recording. Thereafter, an announcement is played at the IP which instructs the subscriber to begin speaking. The subscriber's message is recorded and a release message is generated at the SSP for receipt by the IP. The release message instructs the IP to tear down the call. A ResourceClear message is thereafter generated at the SSP for receipt by the SCP. The ResourceClear message indicates the status of the recording and an ID corresponding to the announcement to be used by the SCP in other services. A Disconnect message is thereafter generated at the SCP for receipt by the SSP. The Disconnect message instructs the SSP to tear down the call.

18 Claims, 2 Drawing Sheets

METHOD FOR RECORDING SUBSCRIBER SPECIFIC MESSAGES IN AN ADVANCED INTELLIGENT NETWORK

TECHNICAL FIELD

The present invention relates generally to Advanced Intelligent Networks (AIN). More particularly, the invention relates to a method for recording subscriber specific messages in a telephone call for use in telephone services.

BACKGROUND ART

Telephone service providers presently have available numerous telephone services which may be offered to subscribers. Many of these services require greetings or other types of audible announcements to be recorded and played. As those skilled in the art will recognize, it is highly desirable to have these messages recorded in the voice of the telephone subscriber. However, the current state of available technology has heretofore prohibited such an approach.

As an example, consider an AIN "Do not Disturb" service which may be used to advise calling parties that the called party is presently unavailable and to try again later. While it would desirable to have this message provided in the voice of the called party, current technology requires such recordings to be physically "burned" into the Read Only Memory (ROM) of the corresponding central office switch of each subscriber. As readily seen, this is clearly an unmanageable task which becomes further complicated if the user desires to change his or her message or telephone at a later date.

Consequently, a need has developed for a method for recording subscriber specific messages for use in telephone services which overcomes the limitations of the prior art. Such a method should permit easy recording of subscriber specific messages in a handful of central locations which may be readily recorded and modified by telephone service subscribers.

DISCLOSURE OF THE INVENTION

It is a principle object of the present invention to provide a method for recording subscriber specific messages in a telephone call for use in telephone services.

It is a further object of the present invention to provide a method as above which is specifically directed for use in cooperation with an AIN Service Switching Point (SSP), the Service Switching Point connected to each of a subscriber, an AIN Service Control Point (SCP), and an Intelligent Peripheral (IP).

In carrying out the above-stated objects and other objects, features and advantages of the present invention, there is provided a method for recording subscriber specific messages in a telephone call for use in telephone services.

The method is directed for use in cooperation with an AIN Service Switching Point (SSP) which is connected to each of a subscriber, an AIN SCP, and an Intelligent Peripheral, as indicated above. The method comprises the steps of generating a "CallInfoToResource" message at the AIN SCP for receipt by the SSP and the IP. The CallInfoToResource message instructs the SSP to establish a connection to the IP and further instructs the IP to record a subscriber specific message.

The method further includes the generation of a PRIFACILITY message at the SSP for receipt by the IP. The PRIFACILITY message instructs the IP to play an announcement and begin recording. Thereafter, the announcement is played at the IP which instructs the subscriber to begin speaking. When the subscriber has completed his or her message, recording is stopped and a RELEASE message is generated at the SSP for receipt by the IP. The release message instructs the IP to tear down the call. Thereafter, a ResourceClear message is generated at the SSP for receipt by the SCP. The ResourceClear message indicates the status of the recording and an ID corresponding to the announcement to be used by the SCP and other services.

Finally, a Disconnect message is generated at the SCP for receipt by the SSP. The disconnect message instructs the SSP to tear down the call.

In one preferred embodiment of the invention, the AIN SCP is connected to the AIN SSP through Common Channel Signaling (CCS) and communicates with the SSP with AIN 0.0 or later TCAP messaging. The subscriber is further connected to the SSP with normal lines such as Basic Rate Interface (BRI), Plain Old Telephone Service (POTS), etc. The SSP is further connected to the IP with trunks such as Primary Rate Interface (PRI), T1, etc. or lines such as Basic Rate Interface (BRI), Plain Old Telephone Service (POTS), etc. In this preferred embodiment, the signaling between the SCP and the IP also takes place using an AIN 0.2 interface.

In another alternative embodiment, the signaling may take place using a direct data interface.

In yet another alternative embodiment, the method of the present invention may be operative with multiple media. In such a case, the incoming trunks/lines terminating at the IP may be mixed in use and the method further requires the generation of an NCA_Request message at the AIN SCP for receipt by the IP. The NCA_Request message requests the media type. Still further, an $NCA_{13}Response$ message will be generated at the IP for receipt by the SCP. The $NCA_{13}Response$ message indicates the type of media selected.

The above objects and other objects, features, and advantages of the present invention are readily apparent from the following detailed description of the best mode for carrying out the invention when taken in connection with the accompanying drawings wherein like reference numerals correspond to like components.

BEST MODES FOR CARRYING OUT THE INVENTION

Figure 1:
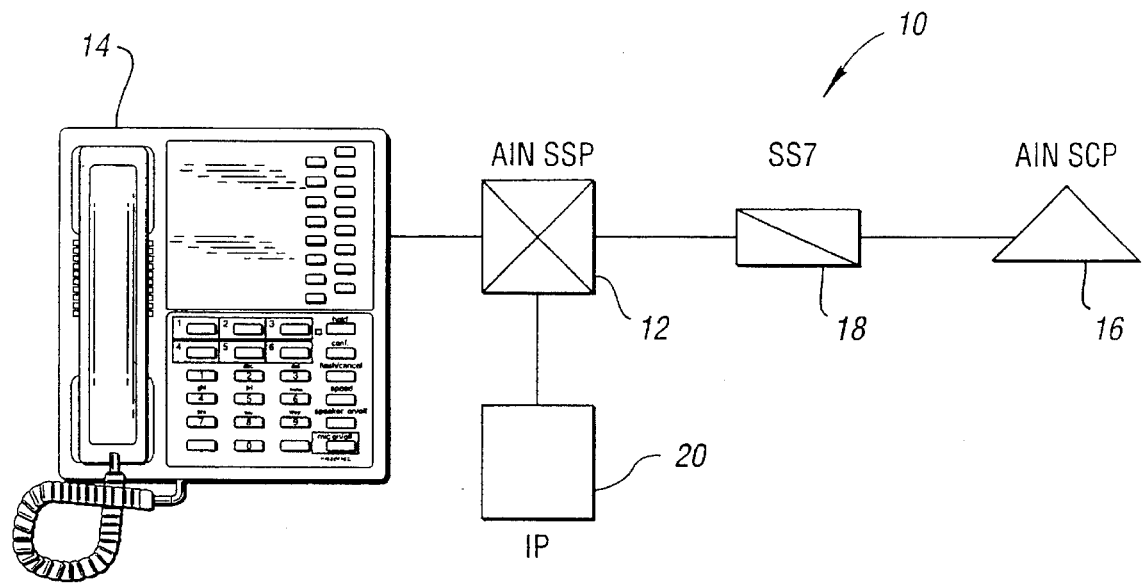
FIG. 1 is a schematic network diagram of the AIN infrastructure required for use with the present invention.

Referring to FIG. 1, there is shown a network diagram of the Advanced Intelligent Network (AIN) infrastructure 10 required for use with the present invention. System 10 includes an AIN end office with AIN 0.0 or later software such as AIN Service Switching Point (SSP) 12. As those skilled in the art will recognize, in AIN architecture, Service Switching Points are generally nodes (usually the subscriber's local switch/central office switch) that recognize the "triggers" used when a subscriber invokes an Intelligent Network service and then communicates with a Service Control Point (SCP) to operate the service. AIN Service Control Points are nodes which contain the service logic and associated data support to execute the required customer services. AIN Service Switching Points are typically connected to AIN Service Control Points via signaling links and packet switches such as AIN Service Transfer Points (STPs).

Referring still to FIG. 1 of the drawings, SSP 12 is connected with the Customer Premises Equipment (CPE) device 14 of the subscriber with normal lines such as Plain Old Telephone Service (POTS), Basic Rate Interface (BRI), etc. System 10 further includes an AIN Service Control Point (SCP) 16 which is connected to SSP 12 through Common Channel Signaling (CCS) such as CCS No. 7 (SS7) and is shown in one preferred embodiment of FIG. 1, connected through a Service Transfer Point (STP) 18.

Designed to be used primarily in high speed digital networks, Common Channel Signaling System No. 7 (SS7) is capable of controlling low speed analog facilities as well. SS7 generally operates at 64 KbPS and can support variable message links up to 2,176 bits (272 octets) of information per message. In keeping with the invention, SCP 16 communicates with Intelligent Peripheral (IP) 20 using either an AIN 0.2 IP interface or a direct data interface.

As those skilled in the art will further recognize, an AIN 0.2 IP interface is an interworking between Transaction Capability Application Part (TCAP) protocol and Integrated Services Digital Network (ISDN) Q.931 protocol, where the SCP 16 communicates to the IP 20 using TCAP, and the IP 20 communicates to the SSP 12 using Q.931. The SSP 12 interworks TCAP and Q.931.

In keeping with the invention, IP 20, which contains recording equipment for voice, fax, and other media, is connected with SSP 12 using trunks (TRI, T1, etc.) or lines (POTS, BRI). IP 20 can also be remotely located.

Alternatively, the signaling between SCP 16 and IP 20 may take place using a direct data interface. This is a direct connection, or connection through a data network, between the SCP 16 and the IP 20. As those skilled in the art will recognize, the higher layer protocol is very similar to that in the AIN 0.2 IP interface, except that Signaling System No. 7 (SS7) is not used. The underlying protocol would most likely be Ethernet, Fiber Distributed Data Interface (FDDI), Switched Multi-megabit Data Service (SMDS), etc.

Figure 2:
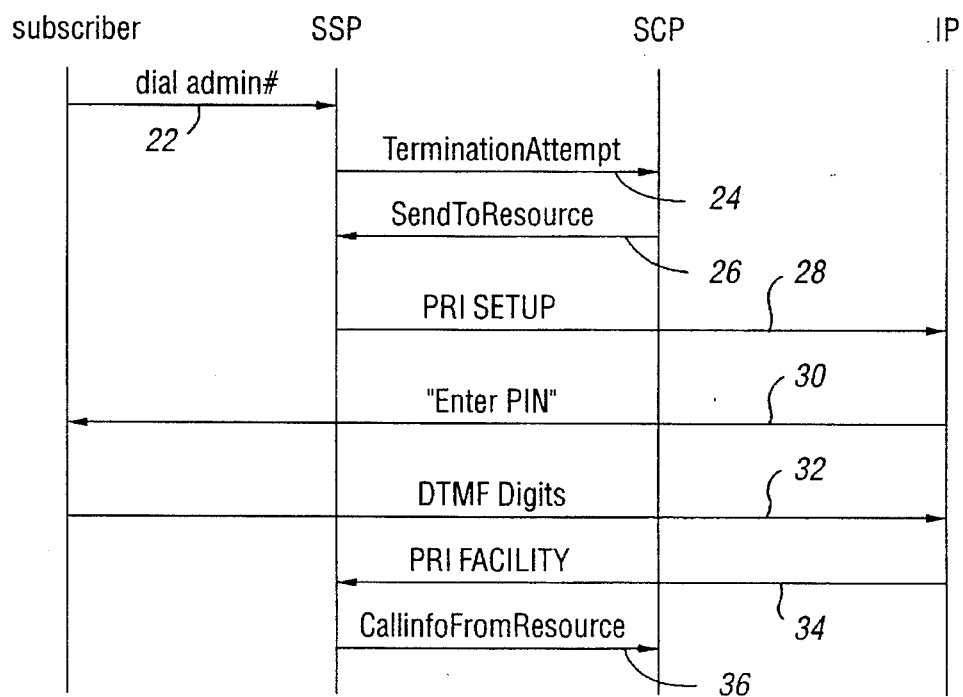
FIG. 2 is a schematic diagram of the call flows resulting when a subscriber calls a specific "administration" telephone number.
Figure 3:
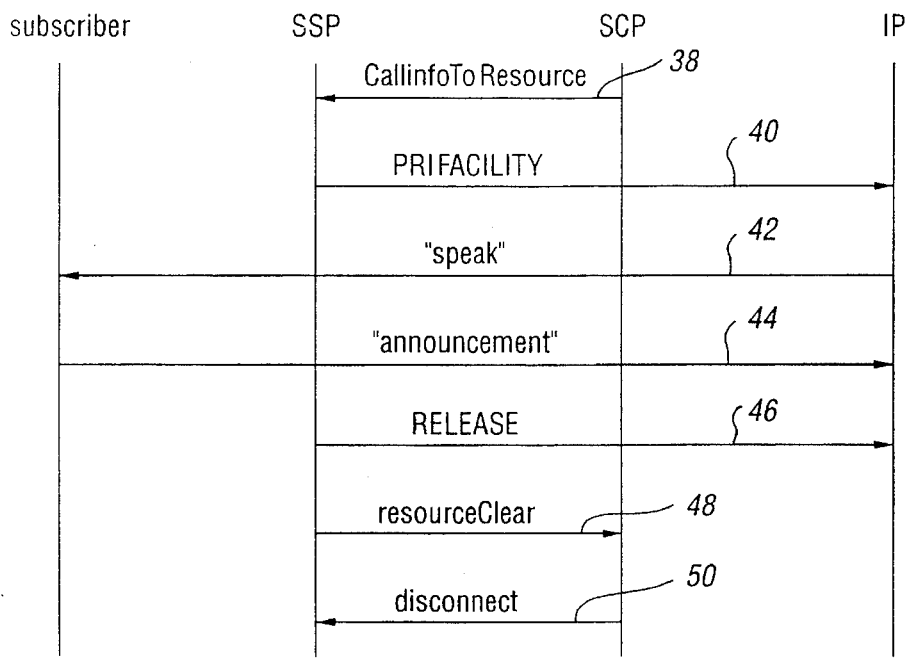
FIG. 3 is a schematic diagram of the message flows of the AIN service logic contained on the SCP in accordance with the present invention.

The capability to record and use messages is controlled through service logic located in the AIN SCP 16. FIGS. 2–3 show the call flows between SSP 12, SCP 16, and IP 20 which are used to record voice for use in an announcement in accordance with the present invention. In these call flows, it is assumed for illustration purposes that an AIN 0.2 IP interface is being used for a local IP.

FIG. 2 provides a schematic diagram of the call flows resulting from a subscriber calling a specific "administration" telephone number. Subsequent to these call flows, the AIN service logic on the SCP is activated with the resulting call flows which are shown in FIG. 3. Referring to FIG. 2, the subscriber must first dial an administration number 22 that is used to record an announcement. This administration number on SSP 12 is provisioned with an AIN trigger. In the example shown, it is a termination attempt trigger 24. In keeping with the invention, however, it is recognized that other triggers could be used. Through the trigger, the SSP 12 detects that the administration number has been dialed and launches an AIN query to the SCP 16. Thereafter, the AIN service logic on the SCP is invoked. Since the user is requesting to record an announcement, SCP 16 responds with a SendToResource message 26. SSP 12 will then send a PRI SETUP message 28 to the IP 20, instructing it, among other things, to play an announcement instructing the subscriber to enter his or her Personal Identification Number (PIN).

Thereafter, the IP plays the prompt to enter PIN 30 followed by the subscriber dialing his or her Personal Identification Number (PIN) via Dual Tone Multi-Frequency (DTMF) digits 32. Thereafter, the IP 20 responds to the SSP 12 with a PRIFACILITY message 34, including the PIN that was dialed by the subscriber 14. Finally, SSP 12 responds to the SCP 16 with a CallinfoFromResource message 36, including the PIN that was dialed by the subscriber 14.

With reference now to FIG. 3 of the drawings, it is assumed that the PIN was entered correctly. The AIN service logic of the SCP to which the present invention is directed may thus be described.

As shown, the SCP 16 sends a CallInfoToResource message 38 to SSP 12. The CallInfoToResource message 38 instructs the SSP 12 to establish a connection to the IP 20, and for the IP 20 to record a message. The AIN CallInfoToResource message is modified. Specifically, the resource-type parameter is expanded to include the following:

1001 Play Announcement and Record Message
1002 Play Announcement, Record Message and Collect Digits
1003 Perform "Text-to-Speech" and Record Message
1004 Perform "Text-to-Speech", Record Message and Collect Digits
1005 Record Fax Message
1006 Record Video Message.

In the preferred embodiment, the following parameters may also be added to the message:
AnnounceRecordBlock::=SEQUENCE {
    [1] IMPLICIT MaximumRecordTime
    [2] IMPLICIT UninterAnnounceBlock OPTIONAL,—defined in TA-1129
    [3] IMPLICIT InterAnnounceBlock OPTIONAL—defined in TA-1129}
AnnounceRecordDigitBlock::=SEQUENCE {
    [1] IMPLICIT MaximumRecordTime,
    [2] IMPLICIT AnnouncementDigitBlock—defined in TA-1129}
TTSRecordBlock::=SEQUENCE {
    [1] IMPLICIT MaximumRecordTime,
    [2] IMPLICIT TextSpeechBlock,—defined in TA-1129
    [3] IMPLICIT UninterAnnounceBlock OPTIONAL,—defined in TA-1129
    [4] IMPLICIT InterAnnounceBlock OPTIONAL—defined in TA-1129}
TTSRecordDigitBlock::=SEQUENCE {
    [1] IMPLICIT MaximumRecordTime,
    [2] IMPLICIT TextSpeechBlock,—defined in TA-1129
    [3] IMPLICIT MaximumDigits,—defined in TA-1129
    [4] IMPLICIT UninterAnnounceBlock OPTIONAL,—defined in TA-1129
    [5] IMPLICIT InterAnnounceBlock OPTIONAL—defined in TA-1129
    [6] DTMFKeyMap OPTIONAL—defined in TA-1129}
RecordFAXBlock::=SEQUENCE {
    [1] IMPLICIT MaximumRecordTime}
RecordVideoBlock::=SEQUENCE {

[1] IMPLICIT MaximumRecordTime}

Thereafter, SSP 12 sends a PRIFACILITY message 40 to IP 20. This message instructs the IP 20 to play an announcement and begin recording, as defined above. The IP 20 thereafter plays an announcement 42 instructing the subscriber to begin speaking. The subscriber begins speaking 44 and, when finished, either lets the IP 20 time out or enters a digit, i.e. a Dual Tone Multi-Frequency (DTMF) digit to complete recording. Next, SSP 12 returns a RELEASE message 46 to the IP 20, instructing it to tear down the call. SSP 12 thereafter returns a ResourceClear message 48 to the SCP 16, indicating the status of the recording and the announcement ID to be used later in another service. It should be noted that in keeping with the invention, the CallInfoFromResource message may also be used if additional recordings are desired in the same session. This capability requires changes to the ResourceClear (and CallInfoFromResource) message as follows.

The FlexResult parameter would be encoded as:

(1) First Octet Bit A-H: RecordingResult (0 for successful, 1 for error, other codes reserved for future use)

(2) Next four octets Bit A-H: AnnouncementID (4 Octets total).

After performing the above steps, the SCP 14 would have an Announcement ID to be used in other services. Finally, SCP 16 returns a Disconnect message 50 to SSP 12, instructing it to tear down the call.

As referenced above, the present invention is also operable with respect to multiple media. In such a case, two preferred methods have been considered by applicant in which the IP 20 and SCP 16 may identify a specific media:

(1) Incoming trunks/lines terminating at the IP 20 can be dedicated to specific media. That is, certain trunk groups may be dedicated to voice messaging, while other trunk groups may be dedicated to FAX messaging, etc. In such case, the service logic on SCP 16 would determine the media type by its trunk identification (ID);

(2) Alternatively, incoming trunks/lines terminating at the IP 20 can be mixed in use. That is, a specific trunk/line can be used for voice and fax. "Off the shelf" equipment exists today that can handle both voice and fax. In such a case, the messaging between IP 20 and SCP 16 needs to identify a media type. Rather than modify existing messages, this will be accomplished with "non-call associated signaling". That is, SCP 16 can send a message to IP 20 at any time, regardless of a call.

In order to do this, the EnvelopContent parameter of the NCA_Request message will be defined (see GR-1129 Core Advanced Intelligent Network (AIN) Switch-Intelligent Peripheral Interface (IPI) generic requirements, Bellcore Issue 1, November 1993 for Non-call Associated signaling message definitions). In operation, SCP 16 would send an NCA_Request message to the IP 20, requesting the media type. IP 20 would then respond with an NCA_Response, indicating voice, FAX, etc. Specifically, the EnvelopContent for the NCA_Request message will be encoded as follows:

First Octet Bit A-H: 1 for query media type message.
The results will be returned in the $NCA_{13}$Response message. The EnvelopContent for the $NCA_{13}$Response message will be encoded as follows:

First Octet Bit A-H: media type (0 for voice, 1 for fax, 2 for video, etc.)

In operation, the applications using the above messages will most likely need to delete messages. It is anticipated that this function will be accomplished with "non-call associated signaling". That is, SCP 16 can send a message to IP 20 at any time, regardless of a call. In order to accomplish this task, the EnvelopContent parameter of the NCA_Request message will be defined (see GR-1129 referenced above for non-call associated signaling message definitions). Specifically, the EnvelopContent for the NCA-Request message will be encoded as follows:

(1) First Octet Bit A-H: 1 for delete message.

(2) Next for Octets Bit A-H: AnnouncementID (4 octets total).

In keeping with the invention, the results will be returned in the $NCA_{13}$Response message. The EnvelopContact for the $NCA_{13}$Response message will be encoded as:

First Octet Bit A-H: delete result (0 for successful, 1 for error, other codes reserved for future use.

Figure 4:
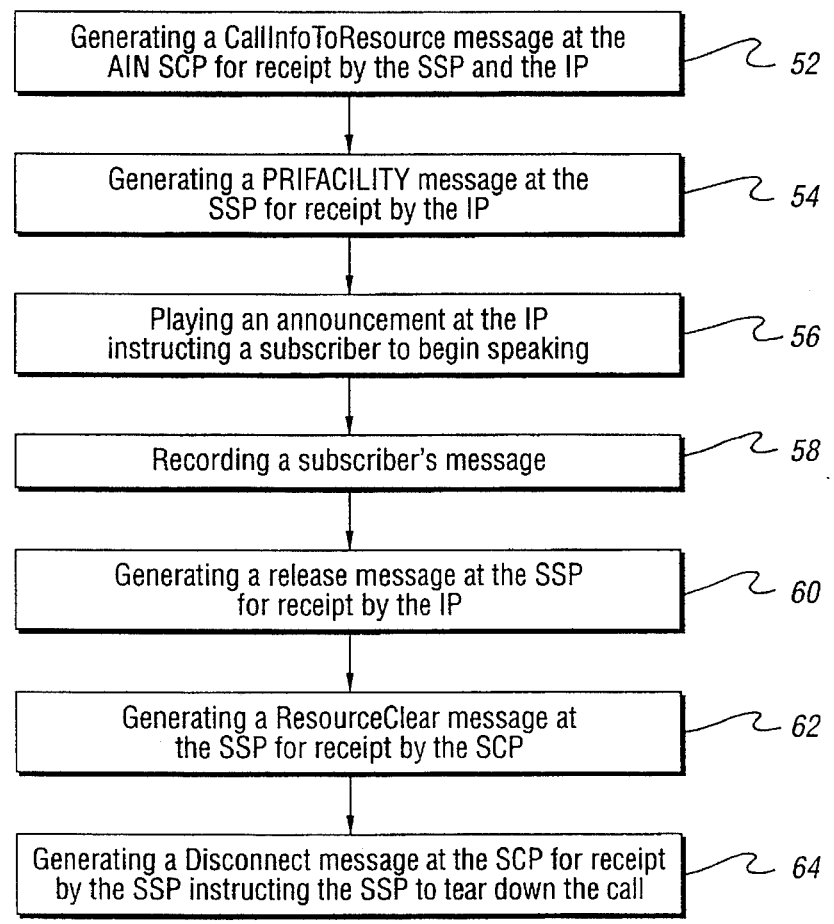
FIG. 4 is a block diagram of the method steps of the present invention.

With reference to FIG. 4 of the drawings, the above method steps may be further summarized. As indicated, the method is directed for use in cooperation with an AIN Service Switching Point (SSP) which is connected to each of a subscriber, an AIN Service Control Point (SCP) and an Intelligent Peripheral (IP). The method includes generating 52 a CallInfoToResource message at the AIN SCP for receipt by the SSP and the IP. The CallInfoToResource message instructs the SSP to establish a connection to the IP and further instructs the IP to record a subscriber message. Thereafter, a PRIFACILITY message is generated 54 at the SSP for receipt by the IP. The PRIFACILITY message instructs the IP to play an announcement and begin recording.

An announcement is thereafter played 56 at the IP instructing the subscriber to begin speaking. Following recordal 58 of the subscriber's message, a RELEASE message is generated 60 at the SSP for receipt by the IP. The RELEASE message instructs the IP to tear down the call. Thereafter, a ResourceClear message is generated 62 at the SSP for receipt by the SCP. The ResourceClear message indicates the status of the recording and an ID corresponding to the announcement to be used by the SCP in other services. Finally, a DISCONNECT message is generated 64 at the SCP for receipt by the SSP. The disconnect message instructs the SSP to tear down the call.

While the best modes for carrying out the invention have been described in detail, those familiar with the art to which this invention relates will recognize various alternative designs and embodiments for practicing the invention as defined by the following claims.

What is claimed is:

1. For use in cooperation with an Advanced Intelligent Network (AIN) Service Switching Point (SSP), said SSP connected to each of a subscriber, an AIN Service Control Point (SCP) and an Intelligent Peripheral (IP), a method for recording a subscriber specific message in a telephone call for use in telephone services, comprising:

generating a CallInfoToResource message at said SCP for receipt by said SSP and said IP, said CallInfoToResource message instructing said SSP to establish a connection to said IP and further instructing said IP to record a subscriber message;

generating a PRIFACILITY message at said SSP for receipt by said IP, said PRIFACILITY message instructing said IP to play an announcement and begin recording;

playing an announcement at said IP instructing said subscriber to begin speaking;

recording said subscriber's message;

generating a RELEASE message at said SSP for receipt by said IP, said release message instructing said IP to tear down the call;

generating a ResourceClear message at said SSP for receipt by said SCP, said ResourceClear message indicating the status of the recording and an identification corresponding to said announcement to be used by said SCP in other services; and generating a Disconnect message at said SCP for receipt by said SSP, said Disconnect message instructing said SSP to tear down the call.

2. The method of claim 1, wherein said AIN SCP is connected to said AIN SSP through Common Channel Signaling (CCS) and communicates with said SSP with AIN 0.0 or later Transaction Capability Application Part (TCAP) messaging.

3. The method of claim 1, wherein said subscriber is connected to said AIN SSP with lines.

4. The method of claim 1, wherein said subscriber is connected to said AIN SSP with Basic Rate Interface (BRI) lines.

5. The method of claim 1, wherein said subscriber is connected to said AIN SSP with Plain Old Telephone Service (POTS) lines.

6. The method of claim 1, wherein said AIN SSP is connected to said IP with trunks.

7. The method of claim 1, wherein said AIN SSP is connected to said IP with Primary Rate Interface (PRI) trunks.

8. The method of claim 1, wherein said AIN SSP is connected to said IP with T1 trunks.

9. The method of claim 1, wherein said AIN SSP is connected to said IP with lines.

10. The method of claim 1, wherein said AIN SSP is connected to said IP with Plain Old Telephone Service (POTS) lines.

11. The method of claim 1, wherein said AIN SSP is connected to said IP with Basic Rate Interface (BRI) lines.

12. The method of claim 1, wherein the signaling between said AIN SCP and said IP takes place using an AIN 0.2 interface.

13. The method of claim 1, wherein the signaling between said AIN SCP and said IP takes place using a direct data interface.

14. The method of claim 1, wherein said IP is remotely located.

15. The method of claim 1, wherein said AIN SCP and said IP are operative with multiple media.

16. The method of claim 1 wherein said AIN SCP includes service logic operative to determine media type by trunk identification.

17. The method of claim 15, wherein said AIN SSP is connected to said IP with trunks and lines.

18. The method of claim 17, further comprising:

generating a NCA_Request message at said AIN SCP for receipt by said IP, said NCA_Request message requesting the media type; and generating a NCA$_{13}$Response message at said IP for receipt by said AIN SCP, said NCA$_{13}$Response message indicating the type of media selected.

* * * * *